United States Patent
Walker et al.

(10) Patent No.: US 6,646,656 B1
(45) Date of Patent: Nov. 11, 2003

(54) GRAPHICAL REPRESENTATION OF THE CONNECTIONS BETWEEN NETWORK DEVICES AND THEIR CONFIGURATION

(75) Inventors: Lee Anthony Walker, Watford (GB); Mark Douglas Cook, St Albans (GB); Christopher Robert Linzell, St Albans (GB); Simon Peter Valentine, Hemel Hempstead (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/528,415

(22) Filed: Mar. 17, 2000

(30) Foreign Application Priority Data

May 10, 1999 (GB) ............................................... 9910840

(51) Int. Cl.[7] .............................................. G06F 19/00
(52) U.S. Cl. ........................................ 345/734; 345/771
(58) Field of Search ................................ 345/734, 735, 345/736–737, 740, 771–773, 837, 774, 776, 838, 825, 853–855, 712–713; 709/200, 205

(56) References Cited

U.S. PATENT DOCUMENTS 5,884,056 A * 3/1999 Steele ......................... 345/734
6,104,392 A * 8/2000 Shaw et al. .................. 345/736
6,229,538 B1 * 5/2001 McIntyre et al. ............ 345/734
6,366,297 B1 * 4/2002 Feagans ...................... 345/736
6,445,682 B1 * 9/2002 Weitz ......................... 370/257

FOREIGN PATENT DOCUMENTS

| JP | 9-297720 | 9/1997 | ........... G06F/13/00 |
| WO | WO 97/37292 | 9/1997 | |
| WO | WO 98/25377 | 11/1998 | ........... H04L/12/24 |

* cited by examiner

Primary Examiner—Steven Sax
(74) Attorney, Agent, or Firm—McDonnell Boehnen Hulbert & Berghoff

(57) ABSTRACT

Network supervising apparatus comprising a store (21), in use, storing information relating to the components (12, 13, 14) of the network, the links (16) between those components, and the type of each link, a visual display apparatus (18) connectable with said store and including processor apparatus (19) to convert the information in said store into a visual display on said visual display apparatus, the visual display representing the physical relationship between the components and the links of the network, said processor apparatus processing the signals to said visual display to visually distinguish at least some of said links according to type.

31 Claims, 3 Drawing Sheets

GRAPHICAL REPRESENTATION OF THE CONNECTIONS BETWEEN NETWORK DEVICES AND THEIR CONFIGURATION

BACKGROUND OF THE INVENTION

The present invention relates to supervising a network, that is a network of electronic components comprising, for example, workstations, personal computers, servers, hubs, routers, bridges, switches, (hereinafter referred to as components of the network), and links between these components which may be in the form of physical cable or wireless links. The network may be a local area network (LAN), wide area network (WAN) or other types and may operate in accordance with any desired protocol.

After such a network has been installed, it is desirable for the person appointed network manager to be able to understand the technical operation of the network. In known network management systems, the manner in which the relevant data is retrieved from the managed devices, compiled and displayed has been problematic in several respects. Firstly, the data received from each of the managed devices is simply compiled and displayed as a list of data for the user to interpret. Secondly, the data does not provide information about unmanaged devices. Thirdly, information about a given network device, such as the type of device, location of the device on the network and operating speed of the device, may be contained in different sections of the compiled data. Consequently, conventional systems are cumbersome and difficult to use.

In co-pending UTK patent applications numbers 9910843.3, 9910844.1, 9910845.8, 9910838.3, 9910837.5, 9910839.1, (each in the name of the assignee of the present application) which are incorporated herein, we describe various arrangements for providing automatic interrogation of the network to thereby produce a network map which may be displayed on a visual display unit showing the components and links between the components. At its simplest, and where the component is a "managed" component, this is usually provided by interrogation using a known protocol, such as the SNMP protocol, of the so-called 'agent' of each component which stores the components unique MAC address, the type of component and the MAC addresses the components which are connected to the ports directly or indirectly.

It is desirable in this supervising capacity to be able to determine the types of link which are available on the network. For example, it is useful to be able to determine readily the speed and capacity of each link. This is particularly desirable where, after some time and changes to the network, it may not be immediately obvious to the network supervisor as to capacity of the network and by simply identifying the types of each link, it is possible to anticipate problems and instigate changes to the network before those problems arise.

SUMMARY OF THE INVENTION

The present invention relates to graphical representation of the connections between network devices and their configuration.

The present invention provides a computer program on a computer readable medium or embodied in a carrier wave for use in supervising a network, said program comprising:

program means for accessing information relating to the components of the network and the links between those components;

program means for converting said information into a form to provide a visual display on a visual display apparatus, the visual display representing the physical relationship between the components of the network and the links between these components;

program means to provide a distinct type of visual image for each type of link;

program means for determining from said information the type of each link;

whereby said program causes said visual display apparatus to provide a visual representation of said network in which at least some of the links are visually distinguished according to type (for example, showing whether the links are full duplex or half duplex, are resilient, are trunk links, and their speed of operation)

The present invention also provides a method of supervising a network comprising:

converting information relating to the components of the network, the links between them, and the type of each link into a visual display on a visual display apparatus, the visual display representing the physical relationship between the components of the network and the links between those components;

and processing the information to provide a distinct type of visual image for each type of link.

The present invention also provides a network supervising apparatus comprising:

a store, in use, storing information relating to the components of the network, the links between those components, and the type of each link;

a visual display apparatus connectable with said store and including processor apparatus to convert the information in said store into a visual display on said visual display apparatus, the visual display representing the physical relationship between the components and the links of the network;

said processor apparatus processing the signals to said visual display to visually distinguish at least some of said links according to type.

BRIEF DESCRIPTION OF THE DRAWINGS

Preferred embodiments of the invention will now be described by way of example only and with reference to the accompanying drawings in which.

DESCRIPTION OF THE PREFERRED EMBODIMENTS

Figure 1:
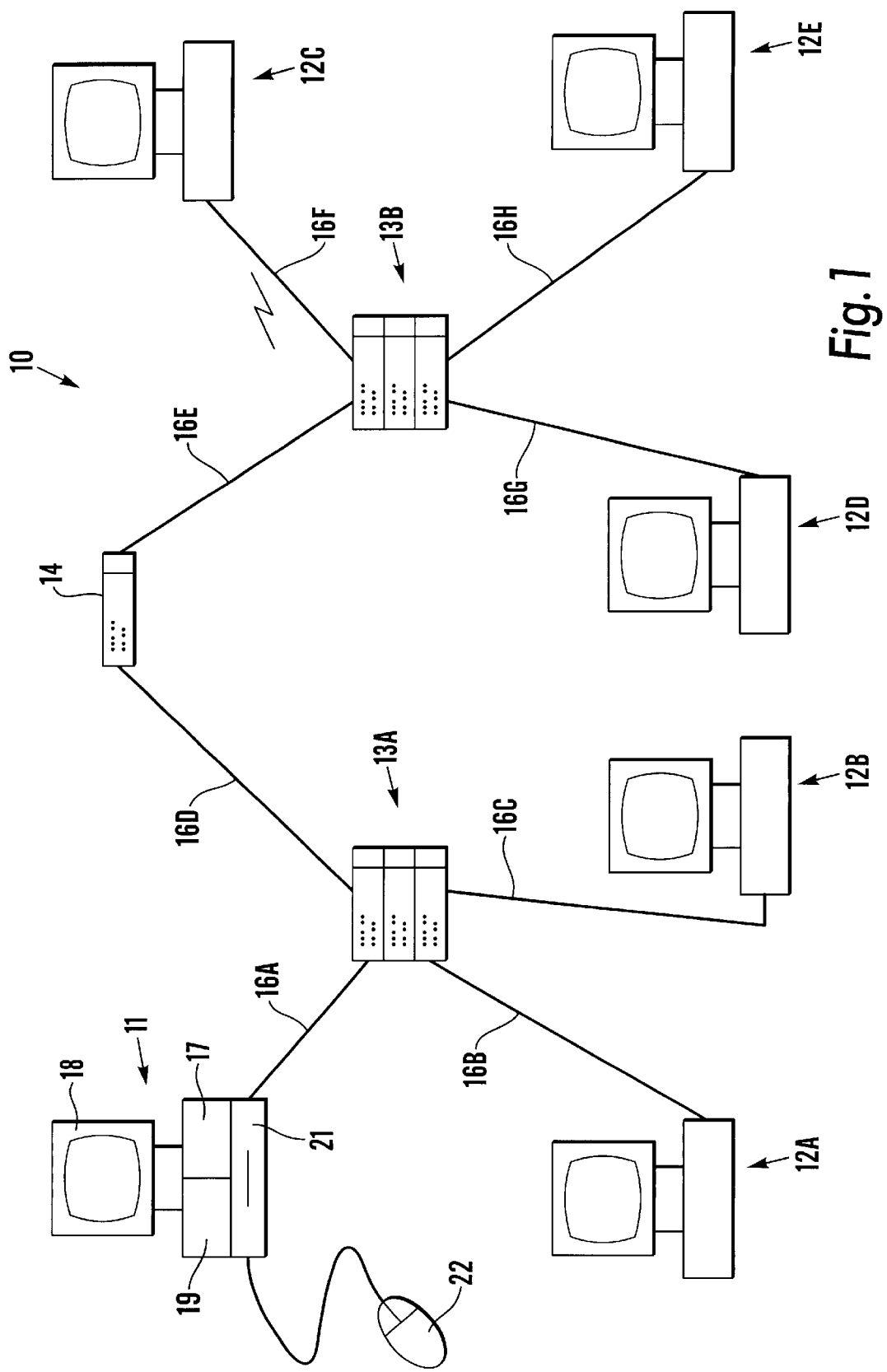
FIG. 1 is a diagrammatic view of a network incorporating a preferred embodiment of the invention.

Referring to FIG. 1 there is shown a network 10 comprising a plurality of components in the form of a network supervisor's workstation or computer 11, other workstations 12B–E, hubs 13A, 13B, and switch 14. The network is a simple network and is set out for purposes of illustration only. Other configurations and arrangements, may be used.

The components are connected together by means of links 16A–H which may be hard wired and utilise any desired protocol, and link 16F which is a wireless link.

The network supervisor's workstation includes, in addition to a visual display unit 18, a central processing unit or signal processor 19, a selector which may be in the form of a mouse 22, a program store 21 which may comprise, for example, a CD drive, a floppy disk drive or a zip drive, and a memory 17 for storing a program which may have been loaded from the program store 21 or downloaded for example via Internet from a website.

By means which is disclosed in the co-pending patent applications referred to above, the network supervisor's computer 11 may interrogate and analyse the network, and store in the memory 17 the information relating to the components within the network and the links between the components. In essence, most quality (i.e. managed) components include a so-called agent which stores information about the component such as its unique MAC number, its ID which identifies what the component is and what model type it is, how many ports it has and how they are connected (i.e. the type of link connected to each port), and the address to which at least some of the ports are connected. The computer 11 interrogates the agents of each component.

The computer 11 may, on command from the selector 22, process signals from the memory 17 by the signal processor 19 and provide on the visual display unit a network map showing each of the components and the links therebetween.

In carrying out the method of the present invention, it is desirable if the supervisor can readily determine the type of link between any two particular components (which, as well as being a function of the physical type of link is also a function of the type of ports to which the link is connected). Whilst it is possible to provide on the visual display text boxes along side each link setting out the type of link, that is its speed, etc, this is clumsy and difficult to follow.

In accordance with the present invention, there is provided a simple graphical way of distinguishing the different types of link on the network map shown on the visual display. Thus the visual image of each link relates to the type of link which it is illustrating.

Figure 2:
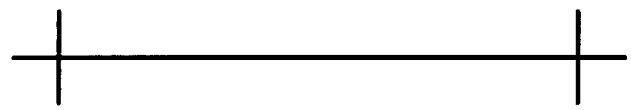
FIGS. 2 to 8 show part of a visual display, illustrating the different types of visual image provided for different types of link, and FIG. 9 sets out the program steps in accordance with a preferred embodiment of the invention.

Thus, for example, in FIG. 2 it will be seen that a link connected at each end to ports which support only half duplex mode is illustrated by a straight line with a single line at right angles adjacent each end of the link.

Figure 3:
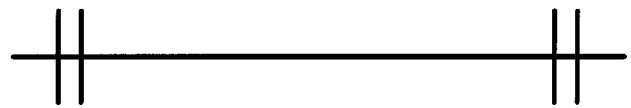

Thus, for example, in FIG. 3 it will be seen that a link connected at each end to ports which support full duplex mode is illustrated by a straight line with a pair of lines at right angles adjacent each end of the link.

Figure 4:
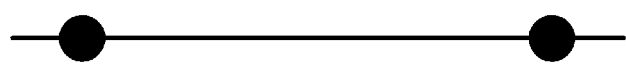

Thus, for example, in FIG. 4 it will be seen that a link connected at each end to ports which support a resilient link is illustrated by a straight line with a single solid circle adjacent each end of the link.

Figure 5:
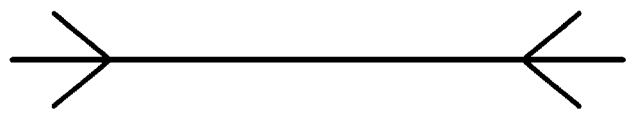

Thus, for example, in FIG. 5 it will be seen that a link connected at each end to ports which support a trunk link is illustrated by a straight line with an arrow adjacent each end of the link.

Figure 6:
Figure 7:
Figure 8:

In FIG. 6 the visual image for a 10 Mbps link is shown to be a narrow line,

In FIG. 7 the visual image for a 100 Mbps link is shown to be somewhat broader line, and In FIG. 8 the visual image for a 1 Gbps link is shown to be an even wider line.

It will be noted that the visual image for the 100 Mbps link is approximately three times thicker than the 10 Mbps, and the 1 Gbps is approximately five times thicker than the 10 Mbps. The absolute width of the lines will depend upon the scale at which the link is displayed and will be chosen so as to be understandable. Thus as one enlarges the view of part of the network, it may be that the thickness of the lines may not need to change.

The symbols in FIGS. 6, 7 and 8 can be combined with the symbols in FIGS. 2 to 5.

The symbols shown in FIGS. 2 to 5 are added to both ends of the link independently, as required, to reflect the attributes appropriate to that end of the link.

Multiple physical links between the same two nodes or components, will be represented as a single link between those nodes.

Furthermore, if the link is a non-validated link, in place of the solid lines shown in FIGS. 6 to 8, we may provide a dotted line. (A validated link is a link where the apparatus has detected and can therefore confirm that the link exists. A non-validated link is a link that exists in the application but which the apparatus has not detected. Such links may exist from either (a) being manually added by the user and perhaps not detectable during the detection phase, or, (b) added during a previous discovery of the network but not detected on a subsequent discovery, i.e. the link has gone down. Hence the application cannot verify that the link still exists.)

Thus by a combination of solid or dotted line, the thickness of the line, or one of 4 symbols attached to the line, the network operator can readily determine the characteristics of the link to provide a substantial technical benefit in the technical management of the network.

The arrangement described will allow the network manager to quickly identify misconfigurations on the network, e.g. when the duplex symbols at both ends of the link do not match. It will be clear there is a mismatch if one end of a link shows a full duplex symbol and the other a half duplex symbol. These symbols reduce the need for large boxes of descriptive text and allow the user to view information for several links at the same time.

One particular advantage of the present arrangement is that it makes it substantially obvious to the network supervisor as to how the network configuration may be changed so as to increase its efficiency of operation. For example, in the case of full duplex and half duplex symbols being at opposite ends of a link, it might become immediately apparent that reconfiguration of the port to which the link end showing a half duplex operation so as to reconfigure the port to provide full duplex operation will improve operation of the link or, alternatively, it may be apparent to the network supervisor that the relevant link should be connected to a different port on the same device which can support full duplex operation.

We have described how the network may be supervised. The method of the invention may be carried out under the control of the network supervisor's workstation or computer and in particular by means of a program controlling the processor apparatus of that computer or elsewhere in the system.

The program for controlling the operation of the apparatus of the invention may be provided on a computer readable medium, such as a CD, or a floppy disk, or a zip drive disk carrying the program or their equivalent, or may be provided on a computer or computer memory carrying the website of, for example, the supplier of the network products. The program may be downloaded from whichever appropriate source (via, for example, a telephone line, wireless radio or infra-red link,) where it may be embedded in a carrier wave and used to control the processor to carry out the steps of the invention as described.

Figure 9:
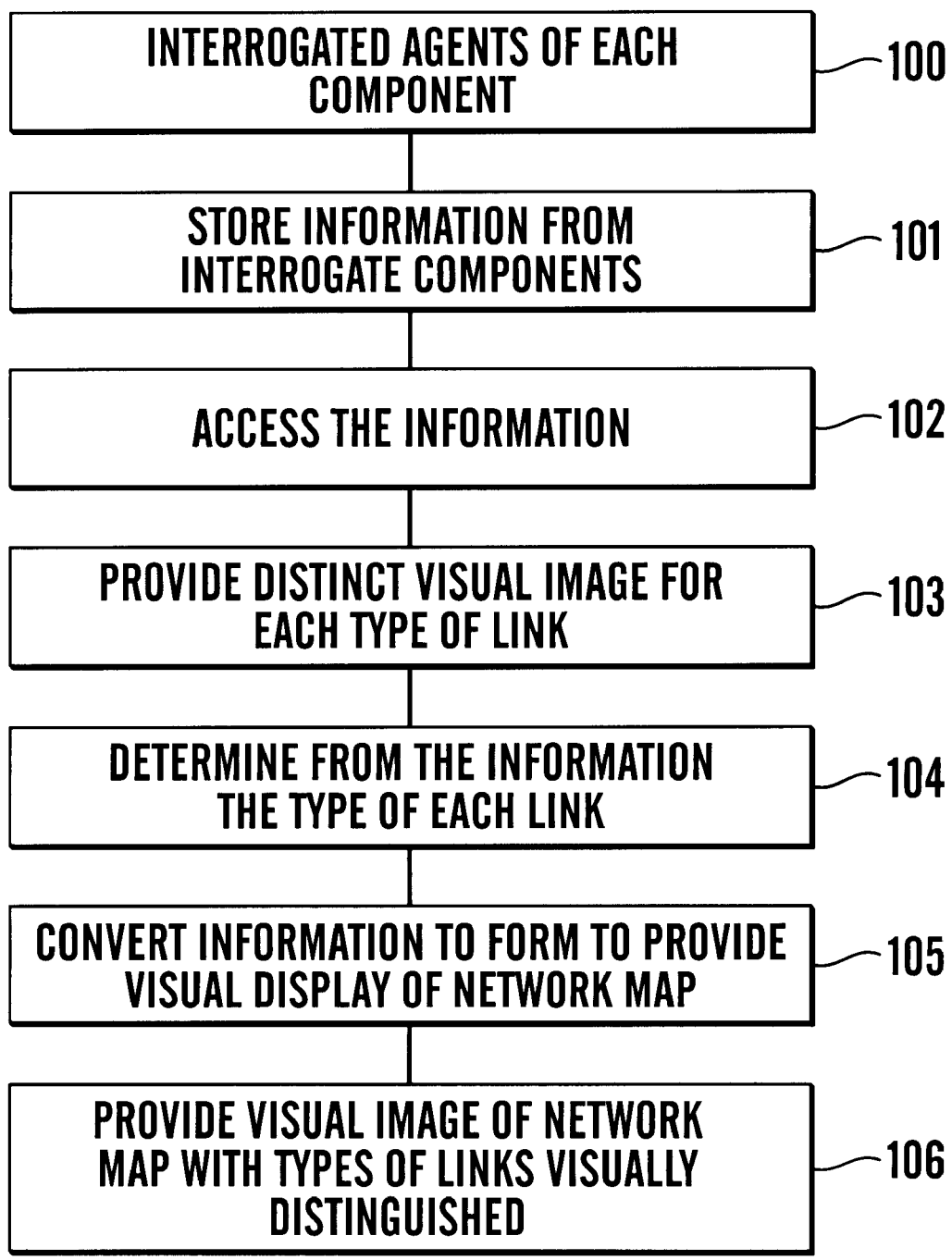

The program may include (see FIG. 9), program step or program means (100) causing interrogation of the agents of each component of the network, program means (101) to store said information, program means (102) for accessing the information relating to the components of the network and the links between those components, program means (103) to provide a distinct type of visual image for each type of link, program means (104) for determining from said information the type of each link, program means (105) for converting the information into a form to provide a visual display on said visual display apparatus representing the components of the network and the links between those components, and program means (106) causes said visual display apparatus to provide a visual representation of said network in which at least some of the links are visually distinguished according to the type of the link (ie. full duplex, half duplex, resilient, trunk, speed of operation) the ports at each end of the link will support and the speed of operation of the link.

Optionally, steps (100) and (101) may be provided by a separate program.

The invention is not restricted to the details of the foregoing example. Clearly other visual symbols may be used to identify the type of link.

What is claimed is:

1. A computer program on a computer readable medium for use in supervising a network, said program comprising:

program means for accessing information relating to the components of the network and the links between those components;

program means for converting said information into a form to provide a visual display in the form of a network map on a visual display apparatus, the network map showing each of the components of the network and the links between these components;

program means to provide a distinct type of visual image for each type of link;

program means for determining from said information the type of each link;

whereby said program causes said visual display apparatus to provide a network map of said network in which at least some of the links are visually distinguished according to type including adding symbols to both ends of the visual image of said at least some of the links to reflect the attributes appropriate to that end of the link whereby to make visually apparent any mismatching of the attributes of each end of a link.

2. A computer program as claimed in claim 1 in which the visual distinction comprises a pictorial representation without text.

3. A computer program as claimed in claim 1 in which the type of links visually distinguished include modes of operation of the link.

4. A computer program as claimed in claim 1 in which the type of links visually distinguished include the speed of operation of the link.

5. A computer program as claimed in claim 1 in which the types of links visually distinguished include whether the link is validated.

6. A computer program as claimed in claim 1 in which the types of links visually distinguished include whether the link is resilient.

7. A computer program as claimed in claim 1 in which the types of links visually distinguished include whether the link is a trunk link.

8. A method of supervising a network comprising:

converting information relating to the components of the network, the links between them, and the type of each link into a visual display in the form of a network map on a visual display apparatus, the network map showing each of the components of the network and the links between those components;

and processing the information to provide a distinct type of visual image on the network map for each type of link including adding symbols to both ends of the image of said each type of link to reflect the attributes appropriate to that end of the link whereby to make visually apparent any mismatching of the attributes of each end of a link.

9. A method as claimed in claim 8 in which the visual distinction comprises a pictorial representation without text.

10. A method as claimed in claim 8 in which the type of links visually distinguished include modes of operation of the link.

11. A method as claimed in claim 8 in which the type of links visually distinguished include the speed of operation of the link.

12. A method as claimed in claim 8 in which the types of links visually distinguished include whether the link is validated.

13. A method as claimed in claim 8 in which the types of links visually distinguished include whether the link is resilient.

14. A method as claimed in claim 8 in which the types of links visually distinguished include whether the link is a trunk link.

15. A method as claimed in claim 8 in which the method is controlled by means of a computer program.

16. A computer program on a computer readable medium loadable into a digital computer, said computer program comprising software for performing the steps of claim 8.

17. Network supervising apparatus comprising:

a store, in use, storing information relating to the components of the network, the links between those components, and the type of each link;

a visual display apparatus connectable with said store and including processor apparatus to convert the information in said store into a visual display in the form of a network map on said visual display apparatus, the network map showing each of the components and the links of the network;

said processor apparatus processing the signals to said visual display to visually distinguish on the network map at least some of said links according to type including adding symbols to both ends of the image of said at least some of the links to reflect the attributes appropriate to that end of the link whereby to make visually apparent any mismatching of the attributes of each end of a link.

18. Network supervising apparatus as claimed in claim 17 in which the apparatus is controlled by means of a computer program.

19. A network supervising apparatus as claimed in claim 17 in which the visual distinction comprises a pictorial representation without text.

20. A network supervising apparatus as claimed in claim 17 in which the type of links visually distinguished include modes of operation of the link.

21. A network supervising apparatus as claimed in claim 17 in which the type of links visually distinguished include the speed of operation of the link.

22. A network supervising apparatus as claimed in claim 17 in which the types of links visually distinguished include whether the link is validated.

23. A network supervising apparatus as claimed in claim 17 in which the types of links visually distinguished include whether the link is resilient.

24. A network supervising apparatus as claimed in claims 17 in which the types of links visually distinguished include whether the link is a trunk link.

25. A computer program embodied in a carrier wave for use in supervising a network, said program comprising:

program means for accessing information relating to the components of the network and the links between those components;

program means for converting said information into a form to provide a visual display in the form of a network map on a visual display apparatus, the visual display representing the physical relationship between the components of the network and the links between these components;

program means to provide a distinct type of visual image for each type of link;

program means for determining from said information the type of each link;

whereby said program causes said visual display apparatus to provide a visual representation of said network in which at least some of the links are visually distinguished by adding symbols to both ends of the visual image of said at least one of the links according to whether the link is full duplex or half duplex, resilient, trunk and whether the ports at each end of the link will support the speed of operation of the link.

26. A computer program as claimed in claim 25 in which the visual distinction comprises a pictorial representation without text.

27. A computer program as claimed in claim 25 in which the type of links visually distinguished include modes of operation of the link.

28. A computer program as claimed in claim 25 in which the type of links visually distinguished include the speed of operation of the link.

29. A computer program as claimed in claim 25 in which the types of links visually distinguished include whether the link is validated.

30. A computer program as claimed in claim 25 in which the types of links visually distinguished include whether the link is resilient.

31. A computer program as claimed in claim 25 in which the types of links visually distinguished include whether the link is a trunk link.

* * * * *